Aug. 6, 1940.   F. A. CHRISTIANSEN   2,210,139
WEIGHT ACTUATED TOY
Filed April 3, 1939
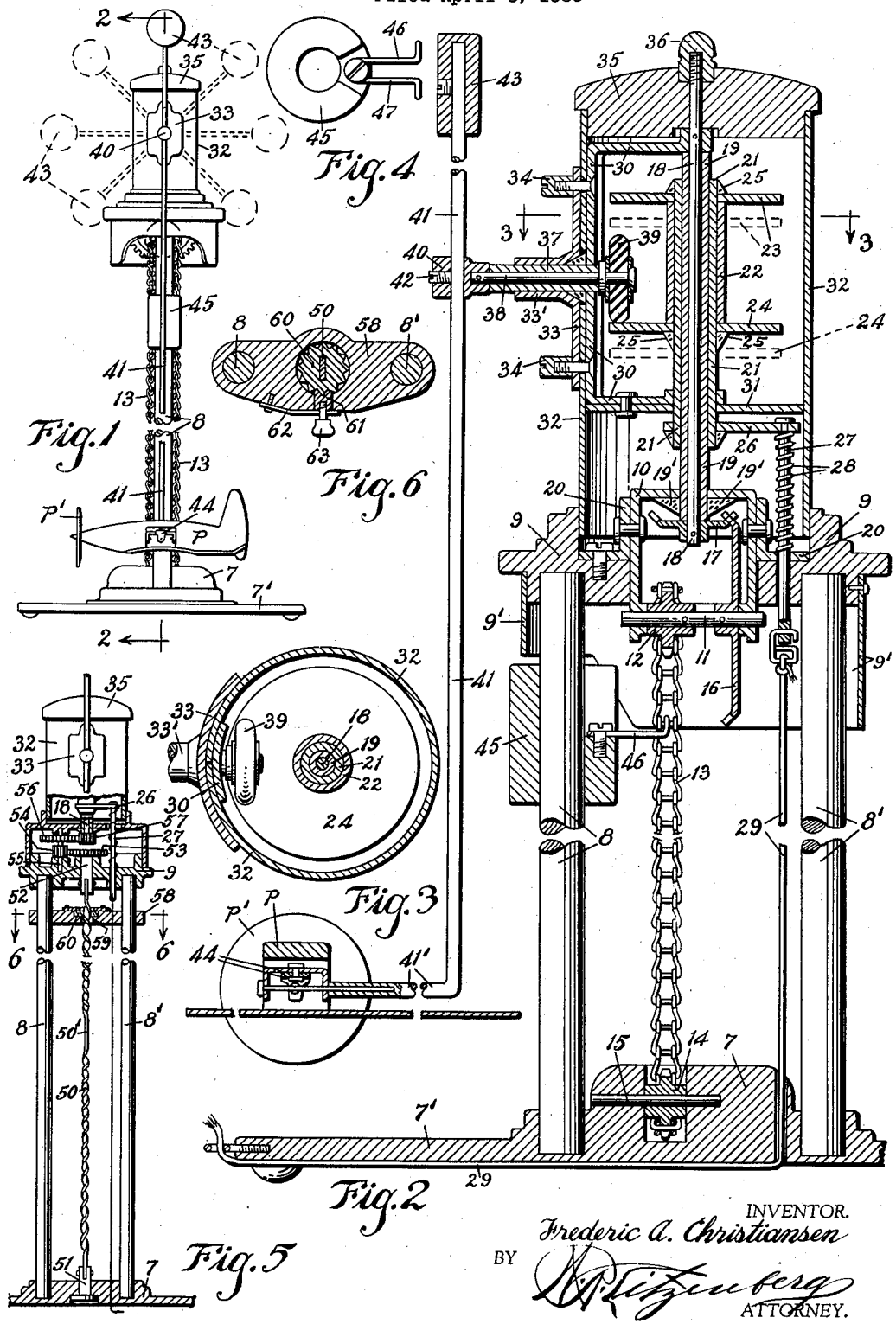
INVENTOR.
Frederic A. Christiansen
BY
ATTORNEY.

Patented Aug. 6, 1940

2,210,139

UNITED STATES PATENT OFFICE 2,210,139

WEIGHT-ACTUATED TOY

Frederic A. Christiansen, Los Angeles, Calif., assignor of one-half to Adolph T. Ashburn, Los Angeles, Calif.

Application April 3, 1939, Serial No. 265,703

7 Claims. (Cl. 272—36)

My invention relates to a weight-actuated toy in which the motive power is a weight adapted to ture composed of a base 7, on which are two upright shafts or pillars, 8, 8', at the upper end of Mounted through said yoke 30, is a bearing sleeve, 37, said sleeve extending through a sleeve 33', forming a part of the outer plate 33, as seen in Fig. 2. Rotatably mounted through said bearing sleeve 37, is a shaft 38, on the inner end of which is secured a rubber friction wheel 39, adapted to frictionally engage with the disc portions 23 and 24 of the spool 22, as said spool is moved up or down, as the case may be, or to be free of said disc portions when said spool is held midway of its movement by means of the pull cord 29, as indicated in light broken lines.

On the outer end of said shaft 38, is a head 40, through which is adjustably mounted an arm 41, secured in place by a set screw 42. On the free upper end of said arm, as shown in Fig. 2, is a weight 43, while at the other end said arm is bent to an angle, or toe portion 41', on which I have shown mounted an airplane P, by means of a universal joint mechanism, designated as a whole 44, whereby said plane can move freely in all directions on its support and assume many different positions as said arm 41 is revolved with said shaft 38, or as it is revolved about a vertical axis with said yoke 30 and the parts connected therewith, and with the shaft 18, hereinafter described.

Mounted to move up and down on the vertical shaft or pillar 8, is a weight 45, shown in section on Fig. 2 and in plan view in Fig. 4, said weight having two wire prongs 46 and 47 extended therefrom in position to selectively engage with one or the other of the two strands of the endless sprocket chain 13, as turned to one side or the other, that is, one prong is positioned to connect with one strand of said chain while the other prong is positioned free of the other strand of said chain. Said weight serves to supply the motive power on said chain and to move it in either direction, depending on which of the two prongs are hooked into the chain. Said weight will move said chain until the weight reaches the base 7, when the weight is then raised by hand and hooked into the link of the chain, on one strand or the other, as desired. Thus the motive power is supplied for driving the shaft 11, the gear 16, the small star or stamped gear 17 and the shaft 18, and with said shaft 18, the yoke 30, the cylindrical member 32, the shaft 38, with its friction rubber wheel 39 and the arm 41, and the plane carried by the toe thereof.

As the pull cord 29 is pulled to engage the friction wheel 39 with one or the other of the disc portions 23 or 24 of the spool, it will be understood that as said friction wheel is moved around in engagement with one or the other of said disc portions, said wheel will be revolved, and will turn the shaft 38 about its horizontal axis, as indicated in the light broken line positions on Fig. 1, where only the weighted upper end of said arm is indicated.

It will be understood that the position of the spool determines the direction of rotation of the wheel 39, its shaft 38 and the arm 41, and if the spool is pulled down only sufficiently to free both of the disc portions 23 or 24 of the friction wheel 39, that then said cylindrical structure, friction wheel shaft 38, the arm 41 and the plane will be revolved about the vertical axis only, the arm assuming a horizontal position with the plane describing a large circle around the structure; and then when the spool is allowed to be moved up by the spring 28, to the position shown, said rubber friction wheel 39 will rotate and will rotate the arm 41 about its horizontal axis, while it is also revolving about the vertical axis, represented by the shaft 18. If the spool be pulled down until the disc portion 23 engages with said wheel, the direction will be reversed. It will be noted that around the head 9, at the upper ends of the shafts or pillars 8, 8', is a skirt 9' which extends below the lower edge of the large gear 16. The gears 16 and 17 are here shown as stamped out of metal, but beveled gears of the usual type could be used.

In Fig. 5, I have shown a modified embodiment of the invention and in which the weight, instead of operating on a sprocket chain, is mounted on a twisted ribbon or member; the opposite ends of which are twisted in opposite directions to provide for the reversal of the direction as the weight passes the neutral middle portion thereof.

In this embodiment of the invention, said twisted ribbon or metal member is designated 50, with its lower end connected with a member 51, to turn freely in the base 7, while its upper end is connected with a short shaft 52, with bearing through the head 9, and with a gear 53 by means of which said member 50 is suspended and by which it drives a pinion 54, on shaft 55 and on which is a larger gear 56, driving a second pinion 57, on the lower end of the shaft 18, corresponding to the shaft 18 in Fig. 2. Similar parts in Fig. 5 are designated with the same reference numerals as used for the parts in Fig. 2. The weight in Fig. 5 is designated 58, and is shown fitting around both of the pillars 8, 8', with a slot 59 therethrough, and a special ratchet 60, seated in its upper side, to make possible movement of the weight by hand.

The weight 58 is best shown in Fig. 6, in enlarged sectional view, and the ratchet 60 is held or released by a special pawl 61, yieldingly held in holding position by means of a leaf spring 62, provided with a knob 63 by means of which the pawl can be released when it is desired to move the weight 58 up to the upper end of the twisted member 50, as will be understood from Fig. 5. The straight portion 50' marks the juncture between the twisted portions which are twisted in different directions so as to make possible reversal of the direction said member is driven as said weight moves down by gravity thereon.

Thus I have provided a simple weight-actuated toy in which two shafts are driven about axes at right angles to each other, one of said shafts being carried bodily around the other shaft while it is being driven about its supporting axis, with means for controlling the direction of rotation of both of said shafts and for reversing the directions, and with means whereby one shaft will be still while being rotated bodily about the other shaft.

With this general construction and arrangement, the airplane, or any other body which it might be desired to mount on the toe of the arm, can be moved through many maneuvers about a vertical axis and about a horizontal axis, with the plane or other body assuming any of the positions between the down position and the up position as its carrying arm is turned about the supporting axis therefor and simultaneously about the vertical axis.

I do not limit my invention to the details of construction and arrangement here shown for descriptive and explanatory purposes, as many changes and modifications can be made within the spirit of my invention, which is defined by a broad interpretation of the hereto appended claims.

I claim:

1. In combination: an arm having a toe portion, a body connected with said toe portion to move freely thereon, relative thereto, means revolubly supporting said arm to turn about an axis transversely thereof, said supporting means being also revolubly supported to turn about an axis at right angles to the axis of rotation of said arm, a driven element for driving said supporting means, a flexible endless driving element connected for driving said driven element and a weight movably mounted to be operatively connected alternately with the strands of said flexible endless driving element for driving it by gravity.

2. In combination: an arm having one end bent to an angle, an airplane mounted on said angle portion with universal joint connection therewith, means for supporting said arm to revolve about an axis transversely therof, a vertical supporting structure therefor and having a part revoluble about a vertical axis with which said supporting means is connected, driving connections for operating said arm supporting means and said revoluble part of said vertical structure, said driving connections including an endless chain, and a weight with means for connecting it alternately to either strand of said endless chain for operating the same by gravity.

3. A weight actuated toy including a supporting structure, a vertical shaft revolubly mounted therein, a horizontal shaft revolubly supported therein, the support therefor being revoluble about the vertical axis of said vertical shaft, an arm carried by said horizontal shaft and having connected with its free end a toy body, a weight, an endless chain element operated on by said weight and operatively connected for driving said vertical shaft and the support for said horizontal shaft, and means around said vertical shaft for revolving said horizontal shaft about its own axis as it is moved bodily around the vertical axis.

4. In a device of the character referred to, a supporting structure, a shaft to be revolved about a vertical axis, a shaft at right angles to the first shaft to be rotated about a horizontal axis, a driving wheel on said latter shaft, a spool on said former shaft having two disc portions to be engaged by said wheel as said spool is moved relative to said wheel on said vertical shaft to drive said horizontal shaft in either direction, means holding said spool against rotation, means for turning said horizontal shaft bodily around said vertical shaft, whereby said wheel will be turned by one or the other of said disc portions as said wheel and its shaft moves around said vertical shaft, an arm carried by the outer end of said horizontal shaft, and a toy airplane carried by the free end of said arm to be moved thereby about both vertical and horizontal axes.

5. In an apparatus of the character referred to, a vertical shaft, means for driving said shaft, a spool-like element on said shaft to slide thereon, a shaft rotatably supported at right angles to said first shaft and said spool-like element, a friction wheel on the end of said shaft and positioned between the ends of said spool, whereby said spool can be moved axially to put one or the other of its two ends in driving engagement with said wheel, means for causing relative movement between said friction wheel and said spool whereby to turn said wheel and its shaft, and an arm carried by said second shaft at right angles thereto, and an airplane movably connected with the end of said arm.

6. In an airplane toy, a supporting structure, a vertical driving shaft, a horizontal driving shaft, an arm on the end of said horizontal shaft, a toy airplane movably connected with the outer end of said arm, driving means connecting the horizontal shaft with the vertical shaft for revolving said horizontal shaft bodily around said vertical shaft, an endless chain with operative connections for driving said vertical shaft, and a weight slidably supported and movable up and down and having prongs adapted to be connected selectively to either strand of said endless chain for driving it.

7. An airplane toy including a vertical structure, a vertical driving shaft mounted therein, a horizontal shaft rotatably supported in said structure to be revolved bodily around said vertical shaft, a driving wheel on the inner end of said horizontal shaft, an arm, carrying an airplane body, on its outer end, a spool-like element movable vertically up and down on said vertical shaft and adapted to engage the wheel on the horizontal shaft at opposite sides when moved for driving said wheel and shaft in opposite directions, gear means for driving said vertical shaft, an endless chain for driving said gear means, and a weight mounted for up and down movement on a support and having means thereon for selectively connecting it with the two strands of said endless chain.

FREDERIC A. CHRISTIANSEN.